US009022372B2

(12) United States Patent
Yeum

(10) Patent No.: US 9,022,372 B2
(45) Date of Patent: May 5, 2015

(54) PANEL JIG APPARATUS FOR VEHICLE

(75) Inventor: Jung Whan Yeum, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 868 days.

(21) Appl. No.: 13/170,933

(22) Filed: Jun. 28, 2011

(65) Prior Publication Data

US 2012/0145849 A1 Jun. 14, 2012

(30) Foreign Application Priority Data

Dec. 8, 2010 (KR) ........................ 10-2010-0124901

(51) Int. Cl.

*B23Q 3/18* (2006.01)
*B23Q 1/25* (2006.01)
*B25B 1/22* (2006.01)
*B25B 11/02* (2006.01)
*F16M 13/02* (2006.01)

(52) U.S. Cl.

CPC ...................................... *B25B 11/02* (2013.01)

(58) Field of Classification Search

USPC .................................... 269/58, 55, 71, 389 R
See application file for complete search history.

(56) References Cited

U.S. PATENT DOCUMENTS 2,768,597 A * 10/1956 Smith ............................ 228/6.1
4,392,604 A 7/1983 Sears
4,411,354 A * 10/1983 Thibault et al. ............ 198/465.1
4,589,184 A * 5/1986 Asano et al. .................... 29/430
4,589,199 A * 5/1986 Ohtaki et al. ................... 29/714
4,627,158 A * 12/1986 Mitoh ............................. 29/771
4,659,895 A * 4/1987 Di Rosa .......................... 219/79
4,670,961 A * 6/1987 Fontaine et al. ................ 29/429
4,736,515 A * 4/1988 Catena ............................ 29/714
4,928,383 A * 5/1990 Kaczmarek et al. ............ 29/711
4,991,707 A * 2/1991 Alexander et al. ......... 198/346.1
5,044,541 A * 9/1991 Sekine et al. .................. 228/6.1
5,123,161 A * 6/1992 Kubo et al. ...................... 29/784
5,150,506 A * 9/1992 Kotake et al. .............. 29/407.05
5,203,811 A * 4/1993 Hirotani et al. ............ 29/407.05
5,347,700 A * 9/1994 Tominaga et al. .............. 29/430
5,428,900 A 7/1995 Hambleton (Continued)

FOREIGN PATENT DOCUMENTS

CN 2893638 Y 4/2007
JP 59-136262 A 8/1984

(Continued)

*Primary Examiner* — Lee D Wilson
*Assistant Examiner* — Alvin Grant
(74) *Attorney, Agent, or Firm* — Mintz Levin Cohn Ferris Glovsky and Popeo, P.C.; Peter F. Corless

(57) ABSTRACT

A panel jig apparatus is provided which has first moving units that are respectively installed at the left and right sides of a base frame, and selectively reciprocate a first sliding plate provided on top of the base frame leftward and rightward on the base frame. Likewise, the second moving units are respectively installed at the front and rear sides of the base frame, and selectively reciprocate a second sliding plate provided on top of the base frame forward and rearward on the base frame. The first support units are movable leftward and rightward on the base frame by the respective first sliding plates, and movable upward and downward by an ascending and descending means so as to support a panel. The second support units are movable forward and rearward on the base frame by the second sliding plates, and provided to support the panel.

7 Claims, 7 Drawing Sheets

(56) References Cited

U.S. PATENT DOCUMENTS

| | | | | |
|---|---|---|---|---|
| 5,816,568 | A * | 10/1998 | Fox | 269/60 |
| 6,493,930 | B1 * | 12/2002 | Raami | 29/783 |
| 6,643,905 | B2 * | 11/2003 | Rhoads et al. | 29/407.09 |
| 7,143,494 | B2 * | 12/2006 | Savoy | 29/407.1 |
| 7,900,896 | B2 * | 3/2011 | Fujita | 269/58 |
| 7,959,141 | B2 * | 6/2011 | Makino | 269/58 |
| 8,485,575 | B2 * | 7/2013 | Yeum | 294/81.6 |
| 2003/0034602 | A1 * | 2/2003 | Kavanaugh | 269/45 |
| 2003/0070277 | A1 | 4/2003 | Jung | |
| 2010/0109221 | A1 * | 5/2010 | Shin et al. | 269/10 |
| 2010/0287767 | A1 | 11/2010 | Woo et al. | |
| 2012/0146274 | A1 * | 6/2012 | Kim | 269/61 |
| 2013/0113149 | A1 * | 5/2013 | Yeum | 269/59 |

FOREIGN PATENT DOCUMENTS

| | | |
|---|---|---|
| KR | 10-2002-0083221 | 11/2002 |
| KR | 10-2003-0005612 | 1/2003 |
| KR | 10-2004-0028340 A | 4/2004 |
| KR | 10-2004-0054996 A | 6/2004 |
| KR | 10-2010-0078729 | 7/2010 |

* cited by examiner

PANEL JIG APPARATUS FOR VEHICLE

CROSS-REFERENCE TO RELATED APPLICATION

This application claims priority to and the benefit of Korean Patent Application No. 10-2010-0124901 filed in the Korean Intellectual Property Office on Dec. 8, 2010, the entire contents of which are incorporated herein by reference.

BACKGROUND OF THE INVENTION (a) Field of the Invention

The present invention relates to a panel jig apparatus for a vehicle, and more particularly, to a panel jig apparatus for a vehicle, which can correspond to panels of different shapes and sizes according to vehicle type, regardless of the dimensions of a panel and the degree of curvature of a surface.

(b) Description of the Related Art

Generally, a vehicle is manufactured by numerous assembling processes using about twenty to thirty thousands of parts. In particular, a vehicle body is formed by a first assembling process such that vehicle body panels are produced in a press process, and each part of the vehicle body is then assembled in a vehicle body factory to form a vehicle body in a body-in-white (B.I.W) state. The formed vehicle body undergoes a main body process for mounting side walls, a loop, a rear panel, etc. on the floor thereof, and then is painted in painting process. After that, an engine, a transmission, interior, and exterior parts are assembled in an outfitting process.

Each panel to be mounted on the vehicle body is fabricated by press working, which is mounted and fixed on a panel jig apparatus in a vehicle body assembly process. The vehicle body then undergoes operations including assembling, welding, sealing, and hemming, and is then painted in a painting process.

During assembly, however, it is difficult to apply the aforementioned conventional panel jig apparatus commonly/universally to panels for different vehicle types as the panels come in different shapes and sizes according to vehicle type. Thus, it is necessary to manufacture dedicated jig apparatuses according to vehicle type.

Moreover, the manufacture of dedicated jig apparatuses according to vehicle type involves significant investment costs that increase each time a new vehicle type is introduced because of additional costs of remodeling and reconstructing a new jig apparatus. Furthermore, because of the advances in the automotive designs the structure of the jig apparatus continually become more and more complicated to make.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made to provide a panel jig apparatus for a vehicle, which can correspond to panels of different shapes and sizes according to vehicle type.

An exemplary embodiment of the present invention provides a panel jig apparatus for a vehicle, including: a base frame, first moving units, second moving units, first support units and second support units. The first moving units are respectively installed at the left and right sides of the base frame, and selectively reciprocate a first sliding plate provided on top of the base frame leftward and rightward on the base frame. Likewise, the second moving units are respectively installed at the front and rear sides of the base frame, and selectively reciprocate a second sliding plate provided on top of the base frame forward and rearward on the base frame. The first support units are movable leftward and rightward on the base frame by the respective first sliding plates, and movable upward and downward by an ascending and descending means so as to support a panel. The second support units are movable forward and rearward on the base frame by the second sliding plates, and provided to support the panel.

In this exemplary embodiment the first moving unit may include a first rail housing, a first drive motor, a first guide rail, and a first rail block. The first rail housing is installed in a left-right direction on the base frame and has the first sliding plate slidably coupled to the top thereof. The first drive motor is disposed on one side of the first rail housing and coupled to a first lead screw. The first guide rail is disposed in a left-right direction on the base frame within the first rail housing, and the first rail block is engaged with the first lead screw and installed to be movable along the first guide rail by operation of the first drive motor, and is connected to the first sliding plate.

Additionally, the second moving unit may include: a second rail housing that is installed in a front-rear direction on the base frame and has the second sliding plate slidably coupled to the top thereof. The second drive motor is provide on one side of the second rail housing and coupled to a second lead screw/and the second guide rail is provided in a front-rear direction on the base frame within the second rail housing. The second rail block is engaged with the second lead screw and installed to be reciprocally movable along the guide rails by the operation of the second drive motor, and is connected to the second sliding plate.

The first support unit may include: a vertical frame mounted on top of the first sliding plate; and a support block that is mounted to be movable up and down by an ascending and descending means mounted on one side of the vertical frame and supports the panel. The ascending and descending means may include: a main body portion that is mounted on the vertical frame, and has a sliding hole longitudinally formed therein; a rod (e.g., a LM rod) that is provided to be movable in the sliding hole; and an operating motor that is connected to the rod and selectively moves the rod. The rod may have at least one guide protrusion formed longitudinally on the outer periphery surface. Further, the main body portion may have at least one rail groove, corresponding to the guide protrusion of the rod, formed on the inner periphery surface of the sliding hole.

The second support unit may include a moving plate that is mounted on top of the second sliding plate; a mounting bracket that is vertically mounted on the moving plate; a guider that is mounted at upper portions of the mounting brackets; and a locator that is mounted at another upper portion of the mounting bracket and supports the bottom of the panel. The locator may include: a mounting block whose one end is mounted on an upper portion of the mounting bracket; a rotating ball rotatably installed in the mounting block; and a support pad connected to the rotating ball.

There may also be a plurality of second moving units, and ascending and descending means that are disposed between the moving plate and the second sliding plate of at least one of the second moving units. The ascending and descending means may include a main body portion that has a sliding hole longitudinally formed therein; a rod (e.g., a LM rod) that is provided to be movable in the sliding hole; and an operating motor that is mounted on the main body portion and connected to the rod to selectively support the rod.

The panel jig apparatus for a vehicle may further include a support means which includes a support frame, installed between the first moving units and the second moving unit and a guider installed on the support frames so as to support the interior of the panel.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DESCRIPTION OF SYMBOLS

Figure 1:
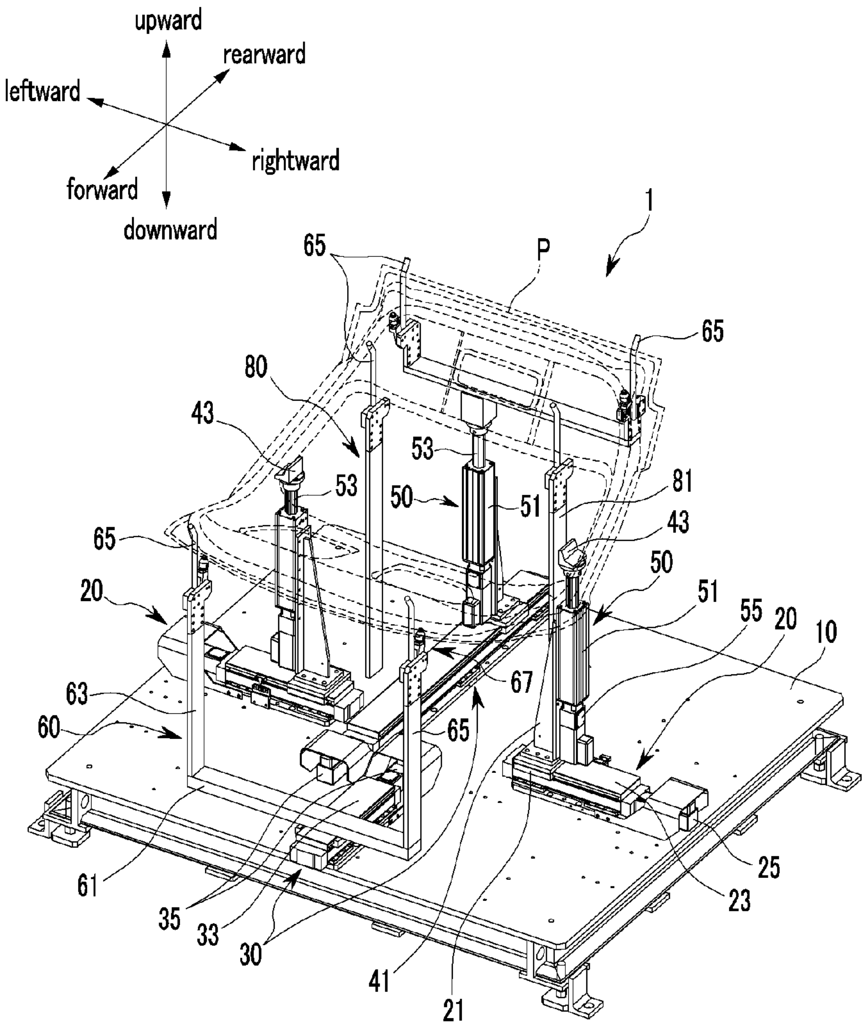
FIG. 1 is a view showing a panel being mounted on a panel jig apparatus for a vehicle according to an exemplary embodiment of the present invention.

10: base frame
20: first moving unit
21: first sliding plate
23: first rail housing
25: first drive motor
26: first lead screw
29: first rail block
30: second moving unit
31: second sliding plate
33: second rail housing
35: second drive motor
36: second lead screw
77: second guide rail
40: first support unit
41: vertical frame
43: support block
50: ascending and descending means
51: main body portion
52: sliding hole
53: rod
55: operating motor
57: guide protrusion
59: rail groove
60: second support unit
61: moving plate
63: mounting bracket
65: guider
67: locator
69: mounting block
71: rotating ball
73: support pad
80: support means
81: support frame It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE EMBODIMENTS

An exemplary embodiment of the present invention will hereinafter be described in detail with reference to the accompanying drawings.

The embodiment described in the present specification and the configuration shown in the drawings are merely an exemplary embodiment of the present invention and do not represent all of the technical spirit of the present invention. Thus, it should be understood that there may be various equivalents and modified examples that can replace the embodiments described in the present specification and the configuration shown in the drawings at the time of filling the present application.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Figure 2:
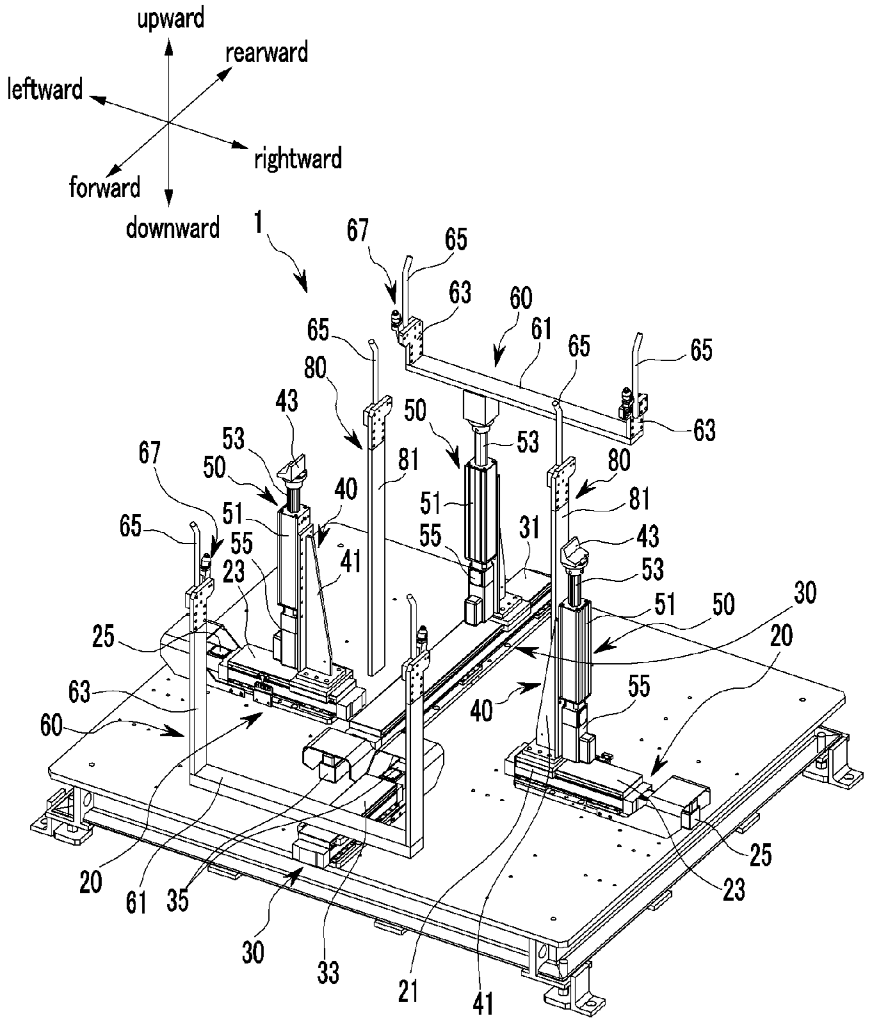
FIG. 2 is a perspective view of the panel jig apparatus for a vehicle according to the exemplary embodiment of the present invention.
Figure 3:
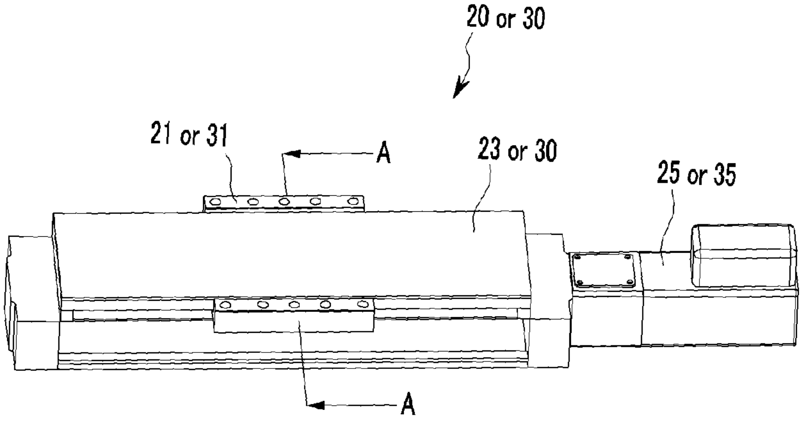
FIG. 3 is a perspective view of a moving unit applied to the panel jig apparatus for a vehicle according to the exemplary embodiment of the present invention.
Figure 4:
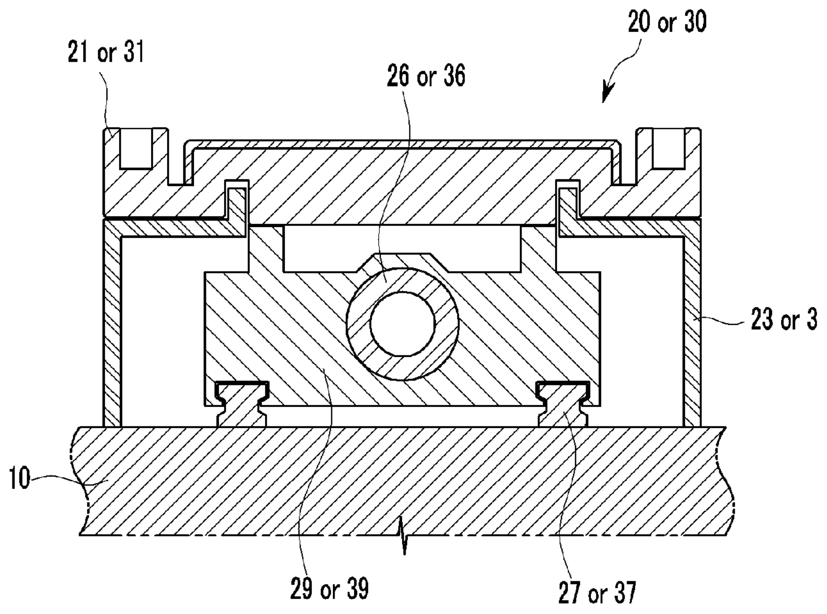
FIG. 4 is a cross-sectional view taken along line A-A of FIG. 3.
Figure 5:
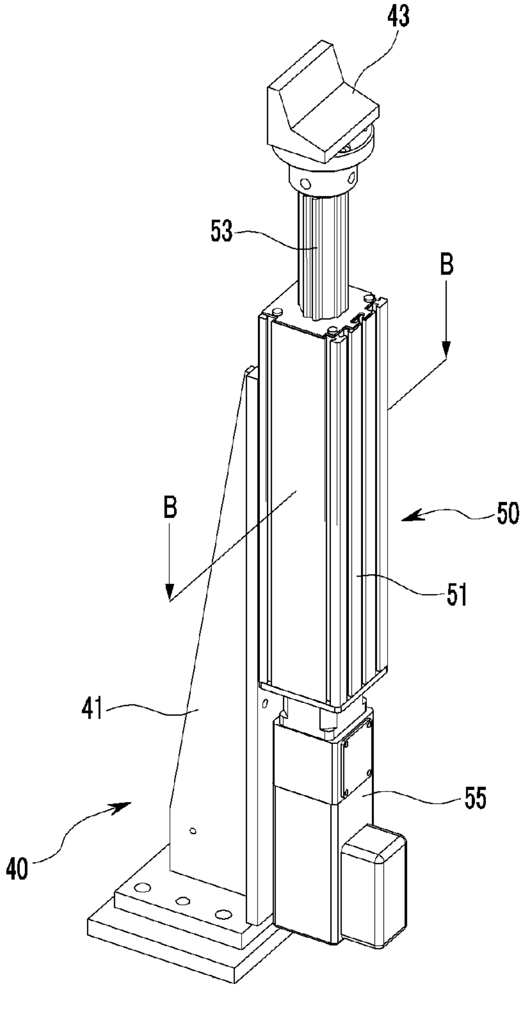
FIG. 5 is a perspective view of an ascending and descending means applied to the panel jig apparatus for a vehicle according to the exemplary embodiment of the present invention.
Figure 6:
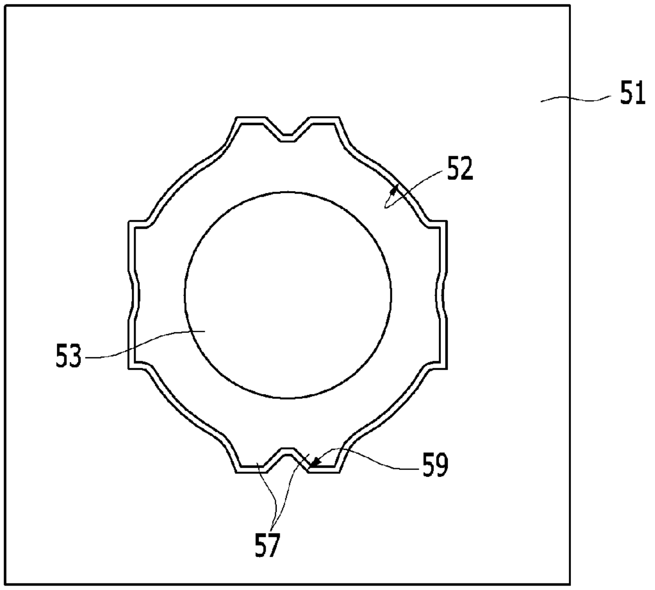
FIG. 6 is a cross-sectional view taken along line B-B of FIG. 5.
Figure 7:
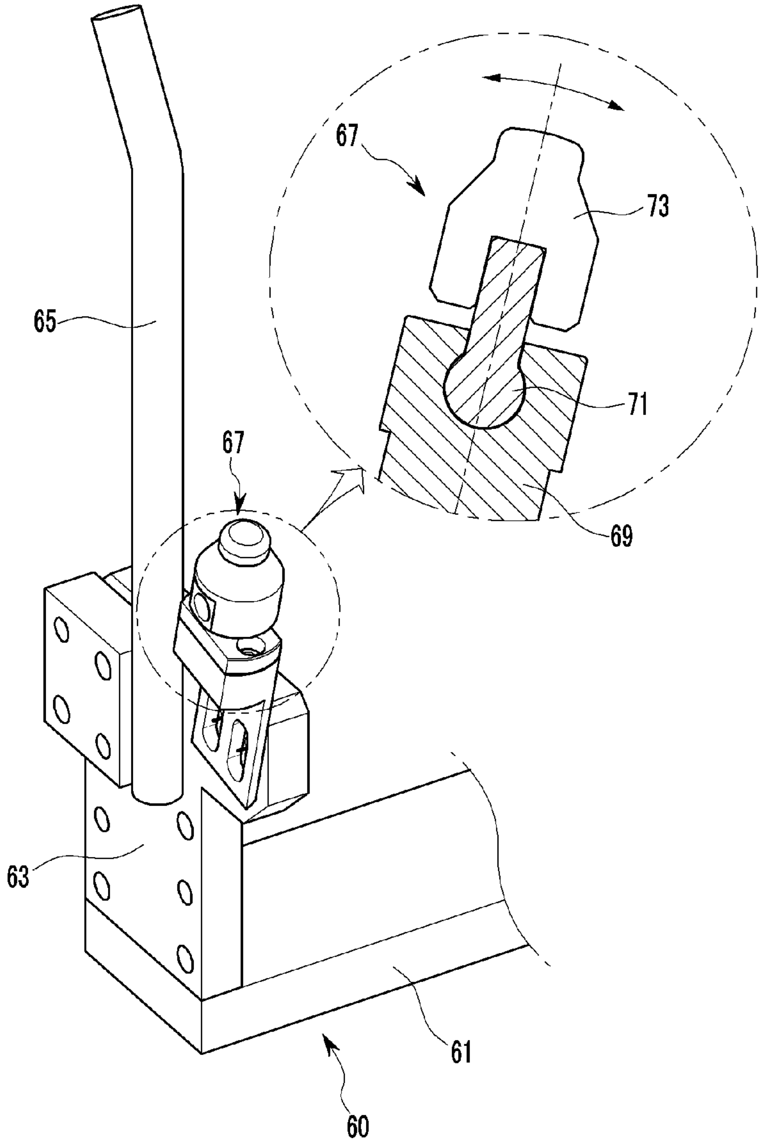
FIG. 7 is a partial perspective view of a second support unit applied to the panel jig apparatus for a vehicle according to the exemplary embodiment of the present invention.

FIG. 1 is a view showing a panel being mounted on a panel jig apparatus for a vehicle according to an exemplary embodiment of the present invention. FIG. 2 is a perspective view of the panel jig apparatus for a vehicle according to the exemplary embodiment of the present invention. FIG. 3 is a perspective view of a moving unit applied to the panel jig apparatus for a vehicle according to the exemplary embodiment of the present invention. FIG. 4 is a cross-sectional view taken along line A-A of FIG. 3. FIG. 5 is a perspective view of an ascending and descending means applied to the panel jig apparatus for a vehicle according to the exemplary embodiment of the present invention. FIG. 6 is a cross-sectional view taken along line B-B of FIG. 5. FIG. 7 is a partial perspective view of a second support unit applied to the panel jig apparatus for a vehicle according to the exemplary embodiment of the present invention.

Referring to the drawings, a panel jig apparatus for a vehicle according to an exemplary embodiment of the present invention is applied to a vehicle body assembly line for mounting and fixing a press-formed panel P thereon and welding or sealing it. To this end, as shown in FIGS. 1 and 2, the panel jig apparatus 1 according to the exemplary embodiment of the present invention comprises a base frame 10, first and second moving units 20 and 30, and first and second support units 40 and 60.

First, the base frame 10 is installed on the floor of a workplace, and the first and second moving units 20 and 30 are mounted on top of the base frame 10.

In the present exemplary embodiment, the first moving units 20 are respectively installed at the left and right sides of the upper surface of the base frame 10, and reciprocate first sliding plates 21 leftward and rightward of the base frame 10, respectively.

The first moving unit 20 of this type has, as shown in FIGS. 3 and 4, a first rail housing 23, a first drive motor 25, a first guide rail 27, and a first rail block 29. First, the first rail housing 23 is installed in a left-right direction on top of the base frame 10, and the first sliding plate 21 is slidably coupled to the top of the first rail housing 23. The first drive motor 25 is mounted on one side of the first rail housing 23, and coupled to a first lead screw 26. The first guide rail 27 is installed on the base frame 10 within the first rail housing 23.

The first rail block 29 is engaged with the first lead screw 26 and installed to be movable along the first guide rail 27 by the operation of the first drive motor 25, and is connected to the first sliding plate 21. That is, in the thus configured first moving unit 20, when the first drive motor 25 rotates in a forward or reverse direction, the first rail block 29 is moved along the first guide rail 27, and at the same time, the first sliding plate 21 connected to the first rail block 29 is moved leftward and rightward of the base frame 10.

In the present exemplary embodiment, the second moving units 30 are installed in a front-rear direction on the upper surface of the base frame 10 between the first moving units 20, and move second sliding plates 31 forward and rearward of the base frame 10.

The description of the second moving units 30 according to the exemplary embodiment of the present invention will be given with reference to FIGS. 3 and 4 since their shape and components are identical to those of the first moving units 20.

Referring to the drawings, the second moving unit 30 comprises a second rail housing 33, a second drive motor 35, a second guide rail 37, and a second rail block 39. First, the second rail housing 33 is installed in a front-rear direction on top of the base frame 10, and the second sliding plate 31 is slidably coupled to the top of the second rail housing 33. The second drive motor 35 is mounted on one side of the second rail housing 33, and coupled to a second lead screw 36. The second guide rails 37 are installed on the base frame 10 within the second rail housing 33. The second rail block 39 is engaged with the second lead screw 36 and installed to be movable along the second guide rails 37 by the operation of the second drive motor 35, and is connected to the second sliding plate 31. That is, in the thus configured second moving unit 20, when the second drive motor 35 rotates in a forward or reverse direction, the second rail block 39 is moved along the second guide rail 37, and at the same time, the second sliding plate 31 connected to the second rail block 39 is moved leftward and rightward of the base frame 10.

The first support unit 40 has, as shown in FIGS. 2 and 5, a vertical frame 41 mounted on top of the first sliding plate 21 and a support block 43 that is mounted to be movable up and down by an ascending and descending means/mechanism 50 mounted on one side of the vertical frame 41 and supports the left and right sides of the panel P. Here, the support block 43 may be made of a rubber material so as to minimize friction upon contact with the panel P and prevent any damage, such as a scratch, on the panel P.

As shown in FIGS. 5 and 6, the ascending and descending means 50 is for reciprocating the support block 43 up and down, corresponding to the panel P having a different shape for each vehicle type, and comprises a main body portion 51, a rod 53 (e.g., a LM rod), and an operating motor 44.

First, the main body portion 51 is mounted on the vertical frame 41, and has a sliding hole 52 longitudinally formed therein at the center thereof. The rod 53 is movably inserted into the sliding hole 52, and is provided with the support block 43 at one end thereof. The operating motor 55 is mounted at the main body portion 51 and connected to the rod 53, and selectively moves the rod 53.

As shown in FIG. 6, the rod 53 may have at least one guide protrusion 57 formed longitudinally on the outer periphery surface. Additionally, the main body portion 51 has at least one rail groove 59, corresponding to the guide protrusion 57 of the rod 53, formed on the inner periphery surface of the sliding hole/aperture 52 into which the rod 53 is inserted.

In the present exemplary embodiment, for example, four guide protrusions 57 are formed at predetermined intervals along the outer periphery surface of the rod 53, and four rail grooves 59 are likewise formed along the inner periphery surface of the sliding hole 52. If the rod 53 moves forward or rearward from the main body portion 51 by the operating motor 55, each of the guide protrusions 57 functions to prevent the rotation of the support block 43 by preventing the rod 53 from being rotated from the main body portion 51. That is, the ascending and descending means 50 moves the support block 43 up and down on the base frame 10, corresponding to the panel P having a different size and shape for each vehicle type, by the operation of the operating motor 5 to thereby support the left and right sides of the panel P.

As shown in FIGS. 2 and 7, the second support unit 60 comprises a moving plate 61, mounting brackets 63, guiders 65, and locators 67. First, the moving plate 61 is mounted on top of the second sliding plate 31. The moving plate 61 moves together with the second sliding plate 31 that moves forward and rearward of the base frame 10 by the second moving unit 30. The mounting brackets 63 are vertically mounted on both sides of the moving plate 61, respectively.

In the present exemplary embodiment, the guiders 65 are for guiding the exterior of the front and rear of the panel P, and are mounted at upper portions of the mounting brackets 63. The locator 67 is mounted on another upper portion of the mounting bracket 63 and supports the bottom of the panel P.

As shown in FIG. 7, the locator 67 has a mounting block 69 whose one end is mounted on an upper portion of the mounting bracket 63, a rotating ball 71 rotatably installed in the mounting block 69, and a support pad 73 connected to the rotating ball 71. That is, as the support pad 73 is configured to be rotatable in the mounting block 69, the locator 67 is able to stably support the panel P even if it is positioned at a sloped or curved portion of the panel P.

Meanwhile, in the panel jig apparatus 1 according to the exemplary embodiment of the present invention, the moving plate 61 of the second moving unit 30 positioned at the rear of the base frame 10 is connected to the second sliding plate 31 through the ascending and descending means 50, and therefore mounted to be movable up and down. That is, the ascending and descending means/mechanisms 50 is interposed between the moving plate 61 and the second sliding plate 31 of at least one of the second moving units 30, and the configuration of the above-described ascending and descending means/mechanisms 50 may be identical to that of the ascending and descending means/mechanisms of FIGS. 5 and 6, and redundant explanation will be omitted. In this case, the moving plate 61 is connected to the end of the rod 53 of the ascending and descending means/mechanisms 50.

In the present exemplary embodiment, the panel jig apparatus for a vehicle may further comprise a support means/mechanisms 80 which includes support frames 81, installed between the second moving unit 30 positioned at the rear and the respective first moving units 20 so as to support the interior of the rear of the panel P, and the guiders 65 installed on the support frames 81.

The panel jig apparatus 1 configured as above is able to support the left and right sides of the panel P as it is lifted or lowered by the operation of the ascending and descending means/mechanisms 50 while each of the first support units 40 reciprocates by the first moving units 20 installed to be movable leftward and rightward on both sides of the base frame 10, corresponding to the panel P having a different size and shape for each vehicle type.

Simultaneously, the second support units 60 reciprocate forward and rearward on the base frame 10 by the second moving units 30 to thereby support the front and rear of the panel P. At this point, the locator 67 stably supports the panel P, being rotated corresponding to a curved or sloped shape of the panel P, and the guiders 65 guide the panel P when the panel P is put into the panel jig apparatus 1.

Accordingly, the thus-configured panel jig apparatus 1 for a vehicle according to the exemplary embodiment of the present invention is commonly applicable to panels P of various vehicle types as it corresponds to panels of different shapes and sizes associated with those vehicle types, regardless of the dimensions of a panel and the degree of curvature of a surface.

Moreover, the panel jig apparatus 1 for a vehicle according to the exemplary embodiment of the present invention can reduce initial investment costs and simplify the overall system configuration as it is universally applicable to panels P of various vehicle types.

In describing the vehicle body moving cart 1 according to the exemplary embodiment of the present invention, the terms “front,” “rear,” “left”, “right,” “up”, and “down” are used to refer to directions with reference to the figures set forth in this specification for better understanding of the drawings and the present invention. However, the use of these terms is not meant in a limiting sense, and the orientations such as “front,” “rear,” “left”, “right,” “up”, and “down” in this specifications may be changed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A panel jig apparatus for a vehicle, comprising:

a base frame;

first moving units respectively installed on left and right sides of the base frame, and selectively reciprocate a first sliding plate provided on top of the base frame leftward and rightward of the base frame;

second moving units respectively installed on front and rear sides of the base frame, and selectively reciprocate a second sliding plate provided on top of the base frame forward and rearward of the base frame;

first support units provided to be movable leftward and rightward on the base frame by the respective first sliding plates, and provided to be movable upward and downward by an ascending and descending mechanism so as to support a panel; and second support units provided to be movable forward and rearward on the base frame by the second sliding plates, and provided to support the panel, wherein each of the first support units further comprises:

a vertical frame mounted on top of the first sliding plate; and a support block mounted to be movable up and down by the ascending and descending mechanism mounted on one side of the vertical frame and to support the panel, wherein the ascending and descending mechanism further comprises:

a main body portion that is mounted on the vertical frame, the main body portion having a sliding hole longitudinally formed therein;

a rod provided to be movable in the sliding hole; and an operating motor connected to the rod and to selectively move the rod.

2. The panel jig apparatus of claim 1, wherein the rod has at least one guide protrusion formed longitudinally on an outer periphery surface thereof.

3. The panel jig apparatus of claim 2, wherein the main body portion has at least one rail groove, corresponding to the guide protrusion of the rod, formed on an inner periphery surface of the sliding hole.

4. A panel jig apparatus for a vehicle, comprising:

a base frame;

first moving units respectively installed on left and right sides of the base frame, and selectively reciprocate a first sliding plate provided on top of the base frame leftward and rightward of the base frame;

second moving units respectively installed on front and rear sides of the base frame, and selectively reciprocate a second sliding plate provided on top of the base frame forward and rearward of the base frame;

first support units provided to be movable leftward and rightward on the base frame by the respective first sliding plates, and provided to be movable upward and downward by an ascending and descending mechanism so as to support a panel; and second support units provided to be movable forward and rearward on the base frame by the second sliding plates, and provided to support the panel, wherein each of the second support units further comprises:

a moving plate mounted on top of the second sliding plate; and mounting brackets vertically mounted on the moving plate, a guider mounted at upper portions of the mounting brackets; and a locator mounted at another upper portion of the mounting bracket and supports the bottom of the panel, wherein the locator comprises:

a mounting block having one end mounted on an upper portion of the mounting bracket;

a rotating ball rotatably installed in the mounting block; and a support pad connected to the rotating ball.

5. The panel jig apparatus of claim 4, wherein there are a plurality of second moving units, and the ascending and descending mechanism is disposed between the moving plate and the second sliding plate of at least one of the plurality of second moving units.

6. The panel jig apparatus of claim 5, wherein the ascending and descending mechanism comprises:

a main body portion that has a sliding hole longitudinally formed therein;

a rod that is provided to be movable in the sliding hole; and an operating motor that is mounted on the main body portion and connected to the rod to selectively support the rod.

7. The panel jig apparatus of claim 4, further comprising a support mechanism which includes a support frame, installed between the first moving units and the second moving units and a guider installed on the support frames so as to support the interior of the panel.

* * * * *